United States Patent [19]

Ozawa

[11] Patent Number: 5,067,036
[45] Date of Patent: Nov. 19, 1991

[54] CASSETTE LOADING MECHANISM FOR ACCOMMODATING CASSETTES OF VARIOUS SIZES

[75] Inventor: Tsugutaro Ozawa, Mito, Japan
[73] Assignee: Hitachi, Ltd., Tokyo, Japan
[21] Appl. No.: 482,705
[22] Filed: Feb. 21, 1990

[30] Foreign Application Priority Data

Feb. 28, 1989 [JP] Japan ............................ 1-045297

[51] Int. Cl.$^5$ .................... G11B 15/675; G11B 15/18
[52] U.S. Cl. .................................... 360/96.5; 360/94; 360/71
[58] Field of Search ............... 360/96.5, 94, 71, 72.3, 360/72.1, 69

[56] References Cited

U.S. PATENT DOCUMENTS

| | | |
|---|---|---|
| 4,398,300 | 8/1983 | d'Alayer de Costemore d'Arc et al. .................................... 360/94 |
| 4,561,031 | 12/1985 | Tanabe .................................... 360/96.5 |
| 4,636,887 | 1/1987 | Kato et al. .................................... 360/71 |
| 4,639,797 | 1/1987 | Kobayashi et al. .................................... 360/71 |
| 4,661,867 | 4/1987 | Tsubota .................................... 360/96.5 |
| 4,868,924 | 9/1989 | Ando et al. .................................... 360/96.5 |

FOREIGN PATENT DOCUMENTS 63-146263  6/1988  Japan.

Primary Examiner—John H. Wolff
Assistant Examiner—Craig A. Renner
Attorney, Agent, or Firm—Antonelli, Terry Stout & Kraus

[57] ABSTRACT

A cassette loading mechanism comprising a cassette holder for holding a cassette positioned at a first position, with a support member for supporting the cassette holder so that the cassette holder is movable from a first position to a second position at which the cassette is loaded along a predetermined path. A first detector detects that the cassette holder has been moved from the first position to the second position, with a second detector detecting that the cassette holder has been moved from the second position to the first position. A specific position detector detects that the cassette holder has reached a specific position on the path with the specific position being a position different from the first position and the second position so that the moving member is controlled by an output from the specific position detector during movement of the cassette holder from the second position to the first position and the cassette holder is stopped at the specific position, whereby the cassette can be pulled out from the cassette holder.

11 Claims, 5 Drawing Sheets

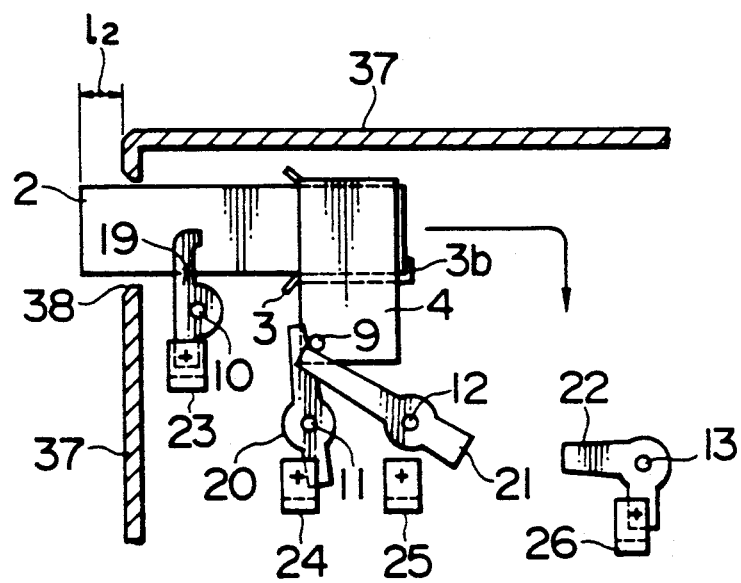
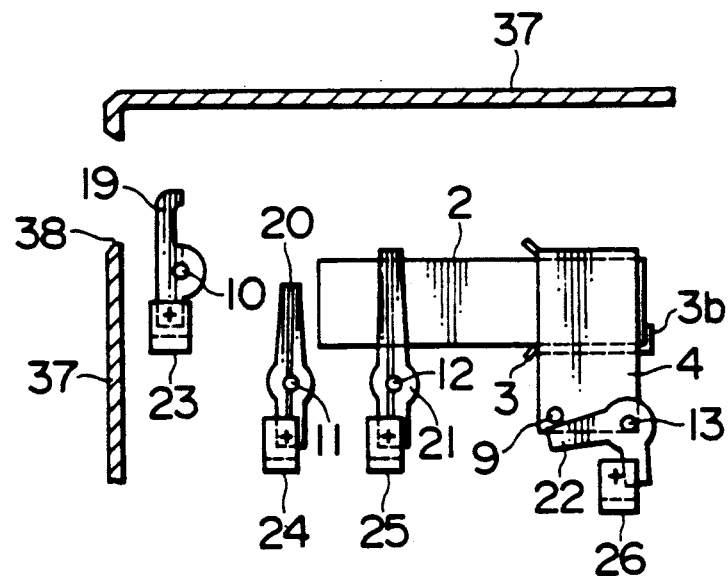

5,067,036

CASSETTE LOADING MECHANISM FOR ACCOMMODATING CASSETTES OF VARIOUS SIZES

BACKGROUND OF THE INVENTION

The present invention relates to a cassette loading mechanism for a cassette type magnetic recording/reproducing apparatus, and, more particularly, to a cassette loading mechanism capable of using a plurality of types of cassettes of different sizes.

Magnetic recording/reproducing apparatuses (VTRs) have been proposed which include a cassette loading mechanism capable of loading cassettes regardless of the size or type of the cassette, with the loading mechanism being capable of using a small cassette by arranging the structure of the cassette loading mechanism in such a manner that the small cassette is inserted into an adapter cassette whose size is the same as that of the large size cassette and the adapter is inserted into the cassette loading mechanism. However, another cassette loading mechanism has been disclosed in, for example, Japanese Patent Laid-Open No. 63-146263 in which the small cassette is directly inserted into the cassette loading mechanism.

However, in the cassette loading mechanism of the type described above, the passage through which the cassette holder moves is the same in both the case where the large cassette is used and the case where the small cassette is used. Therefore, the position at which the cassette holder stops finally during the cassette ejection operation is also nearly the same in both the case where the large cassette is used and the case where the small cassette is used.

The cassette loading mechanism of the type described above is arranged in such a manner that the small cassette projects over the cassette insertion port by a proper length with which at least the small cassette can be readily held and pulled out of the cassette insertion port after the cassette holder has stopped its movement when it is desired to pull out the cassette.

As described above, the passage through which the cassette holder moves is the same in both the case where the large cassette is used and the case where the small cassette is used. Therefore, a user feels uneasiness and is concerned about the reliability of the mechanism since the cassette projects excessively over the cassette insertion port when the large cassette is used.

SUMMARY OF THE INVENTION

An object of the present invention is to provide a cassette loading mechanism capable of overcoming the above-described problem by properly determining the length of projection of the cassette over the cassette insertion port.

In order to overcome the above-described problem, there is provided a cassette loading mechanism comprising means for detecting that a cassette holder reaches a specific position in a passage arranged between a first position to which a cassette is inserted and a second position at which the cassette is loaded, with the detection being made during the movement of the cassette holder from the second position to the first position, whereby a driving member for moving the cassette holder is controlled in accordance with an output from the detection means and the cassette holder is stopped at the specific position.

Furthermore, according to the present invention, there is provided a cassette loading mechanism comprising cassette pull out detection means for detecting that the cassette has been pulled out of the cassette holder which has been stopped at the specific position, whereby the driving member is controlled in accordance with an output from this cassette pull out detection means, and the cassette holder from which the cassette has been pulled out is moved back from the specific position to the first position.

By suitably setting the above mentioned specific position, it is possible to make the cassette which is placed on the cassette holder to project appropriately out of the cassette insertion port when the cassette holder stops at this specific position. Therefore, if the specific position is set according to the size of a cassette, it is possible to select the amount of projection of the cassette so as to permit an easy grasping by fingers, without making it project too great. Accordingly, it is possible to make the amount of projection of different size cassettes nearly the same.

Further, the cassette holder is made to move back to the first position after the cassette is pulled out of the cassette holder at the specific position, whereby the position of the cassette holder can be made nearly the same regardless of the size of the cassette, and the amount necessary for pushing the cassette in may be made substantially the same.

BRIEF DESCRIPTION OF THE DRAWINGS

Other and further objects, features and advantages of the invention will appear more fully from the following description.

FIG. 2 is a cross sectional view which illustrates a state in which a small cassette has been placed in a cassette holder of the cassette loading mechanism shown in FIG. 1;

FIG. 3 is a cross sectional view which illustrates a state in which the small cassette shown in FIG. 2 has been moved to a position at which it is arranged to be loaded;

DESCRIPTION OF THE PREFERRED EMBODIMENT

Figure 1:
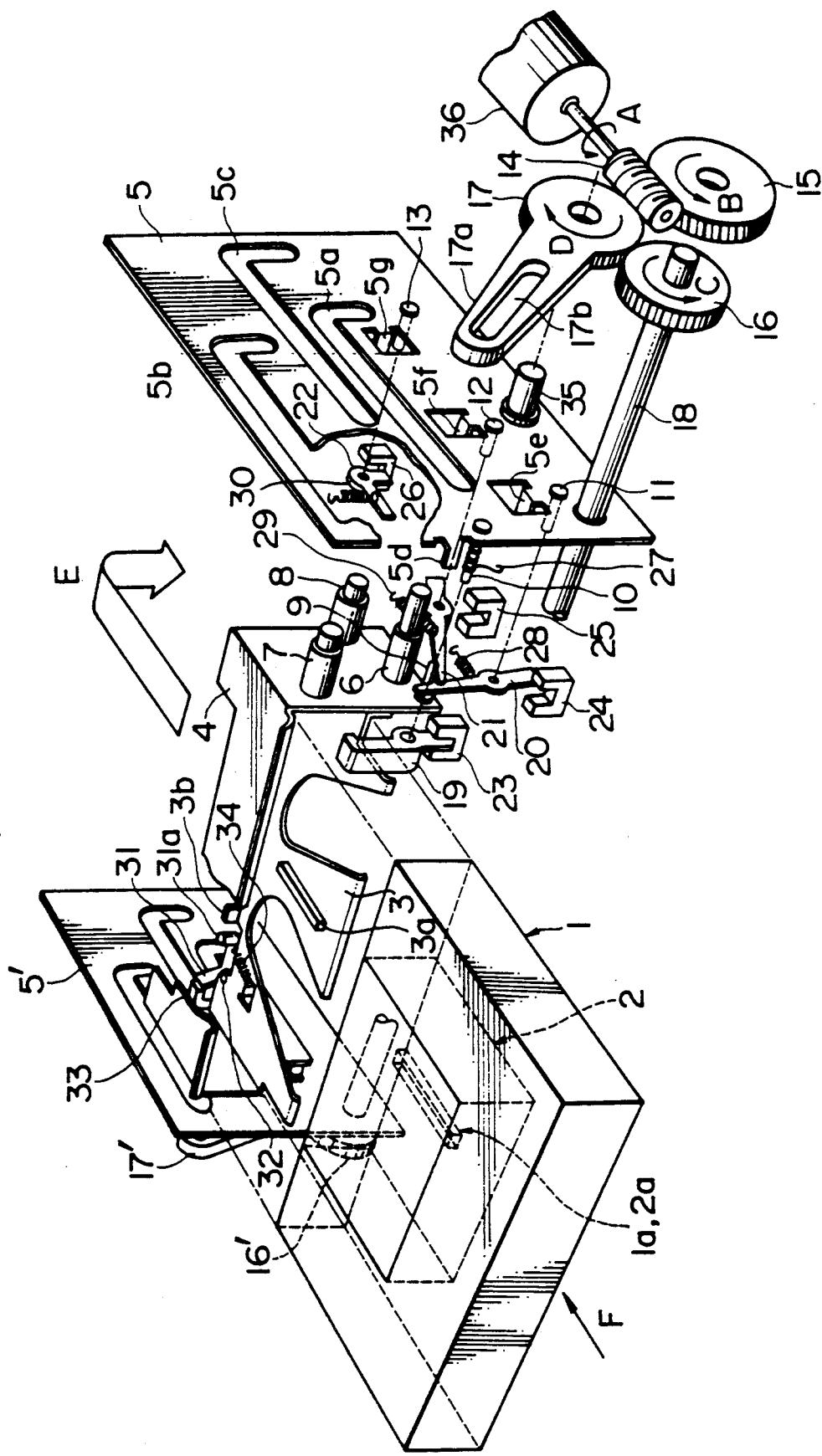
FIG. 1 is an exploded perspective view of a portion of a cassette loading mechanism according to the present invention.

In a cassette loading mechanism shown in FIG. 1, a tray 3 is secured to a cassette holder 4. A rib 3a formed in a direction of an arrow F is disposed in the central portion of the tray 3. A projection 3b is disposed in the inner portion of the tray 3. A groove 1a is formed in the central portion of the bottom of a large cassette 1, while a groove 2a is formed in the central portion of the bottom of a small cassette 2. The large or small cassette 1 or 2 is pushed from a position shown in FIG. 1 in the direction of the arrow F so as to be inserted into the cassette holder 4. The cassette holder 4 is arranged to have its width which is substantially the same as that of the large cassette 1. The distance from the upper surface of the cassette holder 4 to the tray 3 is arranged to be substantially the same as the height of the large cassette 1 and that of the small cassette 2. When the large cassette 1 is pushed in the direction of the arrow F and it is inserted between the tray 3 and the cassette holder 4, the rib 3a formed on the tray 3 is fitted within the groove 1a formed in the bottom of the large cassette 1 with a certain play allowed. As a result, the large cassette 1 can be laterally located. When the small cassette 2 is pushed in the direction of the arrow F, the rib 3a of the tray 3 is fitted within the groove 2a formed in the small cassette 2 with a certain play allowed. As a result, the small cassette 2 can be laterally located. When the large cassette 1 o the small cassette 2 is inserted between the cassette holder 4 and the tray 3 in the direction of the arrow F, the front surface of the large cassette 1 or that of the small cassette 2 comes contact with the projection 3b provided on the tray 3. Thus, the cassette 1 or 2 is placed in the cassette holder 4.

Guide shafts 6, 7 and 8 are embedded in the right side surface of the exterior portion of the cassette holder 4. Similarly, guide shafts (not shown) are embedded in the left side surface of the same. Furthermore, side plates 5 and 5' running parallel to each other are secured to a chassis (not shown). Guide grooves 5a, 5b and 5c are formed in the side plate 5, with each of the guide grooves 5a, 5b and 5c including a horizontal portion) running parallel to the surface of the chassis and a perpendicular portion bent perpendicularly with respect to the horizontal portion. The guide shaft 6 embedded in the cassette holder 4 is fitted within the guide groove 5a, the guide shaft 7 is fitted within the guide groove 5b, and the guide shaft 8 is fitted within the guide groove 5c, with a certain play allowed. Similar guide grooves are formed in the guide groove 5' and guide shafts embedded in the left side surface of the exterior portion of the cassette holder 4 are fitted within the guide grooves with a certain play.

As described above, the cassette holder 4 is supported by the side plates 5 and 5' and it can be moved along the guide grooves 5a, 5b and 5c. The guide grooves 5a, 5b and 5c are arranged to be in the form of the same shape, and their positional relationship on the side plate 5 is arranged to correspond to the positional relationship of the guide shafts 6, 7 and 8 on the right side surface of the exterior portion of the cassette holder 4, with the side plate 5' being arranged similarly). As a result, posture of the cassette holder 4 can always be maintained constant during its movement.

A shaft 35 is secured to the outer surface of the side plate 5. A gear arm 17 is rotatably fastened to the shaft 35. An elongated groove 17b is formed in an arm portion 17a of the gear arm 17 in the direction along the arm portion 17a. The guide shaft 6, embedded in the cassette holder 4 and penetrating the guide groove 5a, is fitted within the elongated groove 17b. The side plate 5' is similarly provided with the gear arm 17'.

A rotatable synchronizing-shaft 18 is provided so as to penetrate the side plates 5 and 5', with the synchronizing shaft 18 having a worm wheel 15 and a gear 16 secured to the right end portion thereof and having a gear 16' secured to the left end portion thereof. The gear of the gear arm 17 is engaged with the gear 16, while the gear of the gear arm 17' is engaged with the gear 16'. A worm 14 with secured to the rotary shaft of a motor 36 with is engaged with the worm wheel 15.

Therefore, when the motor 36 is driven in a direction of an arrow A, the worm wheel 15 is rotated in the direction of an arrow B, causing the gears 16 and 16' to be rotated in a direction designated by an arrow C, that is, in the same direction as the arrow B). Thus, the gear arms 17 and 17' are rotated in the direction designated by an arrow D. As a result, the guide shaft 6 is pushed along the guide groove 5a (similarly to the side plate 5'), causing the cassette holder 4 to be first moved horizontally and lowered perpendicularly along the guide grooves 5a, 5b and 5c in the direction of an arrow E in such a manner that the cassette holder 4 is moved from the first position shown in FIG. 2 to the second position shown in FIG. 3. When the motor 36 is driven in a reverse direction the cassette holder 4 is first raised perpendicularly from the second position and is then horizontally moved toward the first position in a reverse direction with the movement being made along the guide grooves 5a, 5b and 5c.

The cassette holder 4 is moved in the direction designated by the arrow E as the motor 36 is driven so as to feed the large cassette 1 or the small cassette 2 to a predetermined position at which the, cassette is arranged to be loaded. On the contrary, when the motor 36 is driven in a reverse direction the cassette holder 4 is moved in the reverse direction so as to eject the cassette 1 or 2 from the cassette loaded position. The above-described operations are controlled in accordance with the output from sensors described more fully hereinbelow.

A downwardly projecting shaft 32 is embedded in the inner end portion of the tray 3. A sensor arm 31, formed in a bent shape is rotatably secured to the shaft 32 at the central portion of the sensor arm 31, with the sensor arm 31 having a cylindrical projection portion 31a at an end portion thereof. The sensor arm 31 is urged clockwise by a spring 34 when viewed from a position above it. A photosensor 33 is disposed in the vicinity of the shaft 32 formed at the end portion of the tray 3. The photo-sensor 33 comprises a U-shaped package facing side, a light emitting diode and a photo-transistor. The light emitting diode is disposed at either of the projection portions of the package, and the photo-transistor is disposed at another projection of the package so that the light emitting diode and the photo-transistor confront each other. As a result, light emitted from the light emitting diode is received by the photo-transistor. The photo-sensor 33 is placed in such a manner that an end portion of the sensor arm 31 at which the cylindrical projection portion 31a is not provided is introduced between the two projections of the package of the photo-sensor when the sensor arm 31 is rotated. In this state, since light emitted from the light emitting diode is shielded by the sensor arm 31, the photo-transistor does not receive light or is in a light shielded state. However, the sensor arm 31 is urged by the spring 34, causing the cylindrical projection portion 31a to come contact with an end portion of the tray 3. Therefore, the end portion of the sensor arm 31 is positioned away from the photo-sensor 33. As a result, the photo-transistor of the photo-sensor 33 receives light emitted from the light emitting diode so as to be in a light non-shielded state.

When the large cassette 1 or the small cassette 2 is inserted into the cassette holder 4, the front surface of the large cassette 1 or the small cassette 2 pushes the cylindrical projection portion 31a before the front end surface of the large cassette 1 or the small cassette 2 comes contact with the projection 3b of the tray 3. As a result, the sensor arm 31 is rotated counterclockwise relative to the shaft 32, causing the photo-sensor to be brought into the light shielded state. Thus, a fact that the large cassette 1 or the small cassette 2 has been placed in the cassette holder 4 can be detected, causing the motor 36 to be driven in the direction of the arrow A. As a result, the cassette holder 4 is moved in the direction of the arrow E.

Shafts 10, 11, 12 and 13 are embedded in the inner surface of the side plate 5 (in the surface adjacent to the cassette holder 4), with the shafts 10, 11, 12 and 13 being rotatably provided with corresponding sensor arms 19, 20, 21 and 22. The sensor arm 19 is urged counterclockwise, when viewed from the side plate 5, by a torsion spring 27 secured to the shaft 10. The sensor arm 19 is positioned on a passage through which the large cassette 1, to be inserted into the cassette 4, moves, with the passage being positioned between the cassette holder 4 and the cassette insertion port when no cassette has been inserted into the cassette holder 4. The sensor arm 19 is usually erected substantially perpendicularly upon contacting a projection 5d provided on the surface of the side plate 5. When the cassette holder 4 is positioned adjacent to the cassette insertion port in a case where no cassette has been inserted, a cut is formed in the tray 3 and, if necessary, a cut is also formed on the side wall of the cassette holder 4 adjacent to the side plate 5, so as to form a space in which the side arm 19 is positioned. A photo-sensor 23 having the same structure as that of the photo-sensor 33 is fastened to the inner surface of the side plate 5 at a position lower than the position of the shaft 10. When no force is applied from outside to the sensor arm 19 and the sensor arm 19 is substantially perpendicularly, the photo-sensor 23 is brought into the light shielded state by the sensor arm 19. When the large cassette 1 is inserted into the cassette holder 4, the sensor arm 19 is pushed by the large cassette 1 so as to be rotated clockwise relative to the shaft 10. As a result, the light shielded state of the photo-sensor 23 is released. When the small cassette 2 is inserted into the cassette holder 4, the small cassette 2 does not contact the sensor arm 19. As a result, it is determined that the large cassette 1 has been inserted into the cassette holder 4 or the small cassette 2 has been inserted into it. Thus, the sensor arm 19 and the photo-sensor 23 constitute a cassette determining means.

The sensor arm 20, fastened to the shaft, 11 embedded in the side plate 5, is urged in a clockwise direction by the spring 28 when viewed from the side plate 5. A photo-sensor 24, having the same structure as that of the photo-sensor 33, is disposed lower than the shaft 11 but adjacent to the same on the inner surface of the side plate 5. The photo-sensor 24 is switched between th light shielded state and the light non-shielded state due to the rotation of the sensor arm 20. In the initial state in which no cassette has been inserted into the cassette holder 4, the sensor arm 20 is pushed by a pin 9 embedded in the right side surface on the exterior portion of the cassette holder 4 and the sensor ar 20 is thereby brought into a state in which it has been rotated counterclockwise. As a result, the light non-shielded state of the photo-sensor 24 is maintained. When the cassette holder 4 to which the cassette is inserted has been moved in the direction of the arrow E, the sensor arm 20 is released from the urging from the pin 9 so that it is rotated clockwise relative to the shaft 11 until it comes in contact with a projection 5e provided for the side plate 5. Thus, the photo-sensor 24 is brought into the light-shielded state.

The shaft 12 is disposed away from the shaft 11 along in the direction designated of the arrow E. The sensor arm 21, fastened to the shaft 12, is urged clockwise by a spring 29 when viewed from the side plate 5. A photo-sensor 25 having the same structure as that of the photo-sensor 33 is also disposed lower than the shaft 12 but adjacent to the same on the inner surface of the side plate 5. The photo-sensor 25 is switched between the light shielded state and the light non-shielded state due to the rotation of the sensor arm 21. In an initial state in which no cassette has been inserted into the cassette holder 4, the sensor arm 21 is urged counterclockwise by the pin 9 and the photo-sensor 25 is in the light non-shielded state. When the cassette holder 4 to which the cassette has been inserted moves in the direction of the arrow E, the urging force applied to the sensor arm 21 by the pin 9 is reduced and, as a result, the sensor arm 21 rotates in a clockwrse direction. When the urging force from the pin 9 has been completely lost, the sensor arm 21 comes contact with a projection 5f provided for the side plate 5. As a result, the sensor arm 21 brings the photo-sensor 25 into the light shielded state.

The shaft 13 is disposed adjacent to the perpendicular portion of the guide groove 5a but lower than the same. The sensor arm is rotatably fastened to the shaft 13. The sensor arm 22 is urged in a clockwise direction by a spring 30 when viewed from the side plate 5. A photo-sensor 26 having the same structure as that of the photo-sensor 33 is disposed lower than the shaft 13 but adjacent to the same which is provided on the inner surface of the side plate 5. The photo-sensor 26 is switched between the light shielded state and the light non-shielded state due to the rotation of the sensor arm 22. The rotation of the side arm 22 is restricted by a projection 5g provided on the side plate 5, causing the photo-sensor 22 to be brought into the light shielded state. When the cassette holder 4, to which the cassette has been inserted, is moved in the direction of the arrow E and it is lowered along the perpendicular portions of the guide grooves 5a, 5b and 5c until it reaches a predetermined position, with the pin 9 provided on the side surface of the cassette holder 4 pushing the sensor arm 22. As a result, the sensor arm 22 is rotated in a counterclockwise direction relative to the shaft 13 so that the photo-sensor 26 is brought into the light non-shielded state.

The photo-sensor 25 acts to detect whether the cassette has been fed to a predetermined position by the cassette holder 4. When the photo-sensor 26 has been brought into the light non-shielded state, the motor 36 is stopped. The above-described sensor arm 22 and the photo-sensor 26 constitute first detection means.

The sensors 24 and 25 act to detect the position of the moving cassette holder 4, the outputs from the sensors 24 and 25 being used when the cassette is fed so as to be ejected.

Then, the operation for loading the small cassette 2 performed according to this embodiment will be described with reference to FIGS. 1, 2 and 3.

Referring to FIG. 1, when the small cassette 2, pushed in the direction designated by the arrow F, is placed in the cassette holder 4, the sensor arm 31 rotates in a counterclockwise direction when viewed from a position above the sensor arm 31, and, as a result, the photo-sensor 33 is brought into the light shielded state.

The light shielded state is shown in FIG. 2, where the small cassette 2 projects outwards by a length $l_2$ over a cassette insertion port 38 formed in the case 37 of a VTR. Since the small cassette 2 does not come in contact with the sensor arm 19 when it is inserted into the cassette insertion port 28, the photo-sensor is in the light shielded state. The photo-sensors 24 and 25 are in the light non-shielded state since the sensor arms 20 and 21 have been rotated by the pin 9 of the cassette holder 4. On the other hand, the photo-sensor 26 is in the light shielded state.

Referring to FIG. 1, when the photo-sensor 33 has been brought into the light shielded state, the motor 36 rotates in the direction of the arrow A. As a result, the cassette holder 4 moves from the position shown in FIG. 2 in the direction of the arrow E so that the small cassette 2 is fed. Simultaneously, the sensor arms 20 and 21 rotate clockwise, when viewed in FIG. 2, so that the photo-sensors 24 and 25 are brought into the light shielded state.

When the cassette holder 4 is moved horizontally and lowered perpendicularly until it is brought to a state, shown in FIG. 3, the pin 9 of the cassette holder 4 rotates the sensor arm 22 in a counterclockwise direction. As a result, the photo-sensor of the first detection means is brought into the light non-shielded state, causing the motor 36 (FIG. 1) to be stopped. Therefore, the small cassette 2 is positioned at a predetermined loading position.

It is detected that the cassette 4 has been inserted into the cassette holder 4 from a fact that the photo-sensor 33 has been switched to the light shielded state. Furthermore, it is detected that the loaded cassette is the small cassette 2 from a fact that the photo-sensor 23 of the cassette determining means has been maintained at the light shielded state.

When the operation for ejecting the small cassette 2 is conducted in the state shown in FIG. 3, the cassette holder 4 moves, in the reversed manner to that described above, namely, horizontally in the direction toward the cassette insertion port 38 after it has been raised perpendicularly. As a result of this horizontal movement, the pin 9 of the cassette holder 4 first pushes the sensor arm 21 so as to rotate it counterclockwise. As a result, the photo-sensor 25 is brought into the light non-shielded state. However, the cassette holder 4 does not respond to this but moves in the horizontal direction as it is. The action that the cassette holder 4 does not respond to the above-described state is determined by a fact that the photo-sensor 23 has been maintained at the light shielded state, that is, a fact that the small cassette 2 has been inserted into the cassette holder 4. Then, the pin 9 of the cassette holder 4 pushes the sensor arm 20 so as to rotate the sensor arm 20 in the counterclockwise direction. As a result, the photo-sensor 24 is brought into the light non-shielded state, and the motor (FIG. 1) is stopped and a state is realized in which the small cassette 2 projects over the cassette insertion port 38 by length $l_2$(FIG. 2). Therefore, the small cassette 2 can be pulled out by holding the portion projecting over the cassette insertion port 38. The sensor arm 20 and the photo-sensor 24 constitute a second detection means.

In order to make length $l_2$ of the projection suitable to easily hold the small cassette 2 but to prevent excessive length, the positions of the sensor arm 20 and the photo-sensor 24 are determined.

Figure 4:
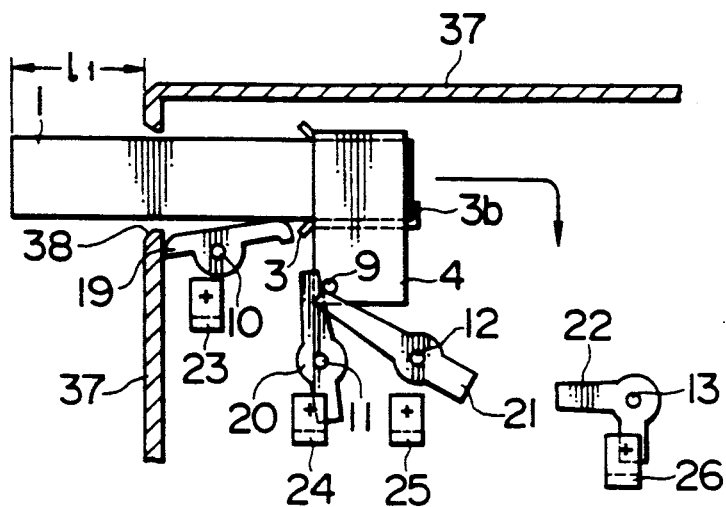
FIG. 4 is a cross sectional view which illustrates a state in which a large cassette has been placed in the cassette holder of the cassette loading mechanism shown in FIG. 1.

FIG. 4 illustrates a state in which the large cassette 1, inserted into the cassette insertion port 38, has been placed in the cassette holder 4. This state corresponds to the state shown in FIG. 2 where the small cassette 2 has been placed. In this state, since the large cassette 1 projects by length $l_1$ ($>l_2$) over the cassette insertion port 38 and the large cassette 1 comes contact with the sensor arm 19 of the cassette determining means, the sensor arm 19 rotates in clockwise direction upon insertion of the large cassette 1. As a result, the photo-sensor 23 is brought into the light non-shielded state, thereby detecting that the large cassette 1 has been placed in the cassette holder 4 is detected.

When the photo-sensor 33 has been shifted to the light stopped state, the motor 36 is driven in the direction of the arrow A (FIG. 1) and the cassette holder 4 moves in the direction as designated by an arrow in FIG. 4. Accordingly, the sensor arms 20 and 21 rotate in a clockwise direction as described with reference to FIGS. 2 and 3 so that the photo-sensors 24 and 25 are brought into the light shielded state. When the cassette holder 4 is lowered perpendicularly after it has moved horizontally, the sensor arm 19 comes contact with the rear surface of the large cassette 1 and then it further rotates in a clockwise direction.

Figure 5:
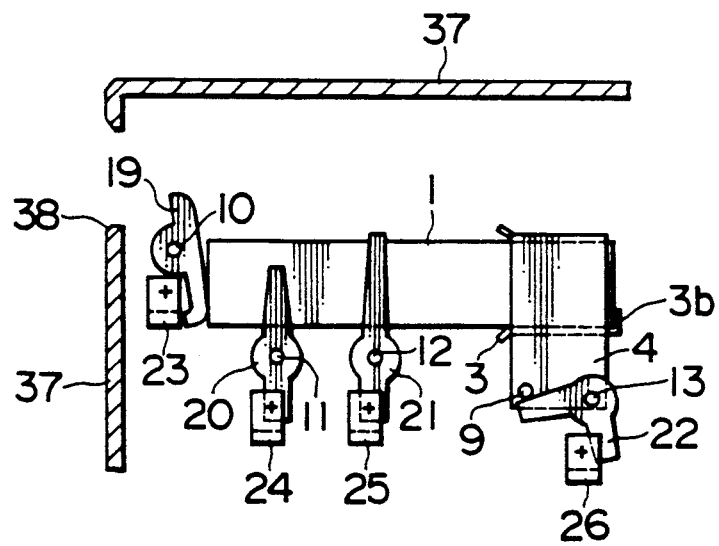
FIG. 5 is a cros sectional view which illustrates a state in which the large cassette shown in FIG. 4 has been moved to a position at which it is arranged to be loaded.

As shown in FIG. 5, when the cassette holder 4 is lowered, the pin 9 rotates the sensor arm 22 of the first detection means in a counterclockwise direction. When the photo-sensor has been thus brought into the light non-shielded state, the motor 36 (FIG. 1) is stopped. As a result, the large cassette 1 is positioned at a predetermined loading position. At this time, since the sensor arm 19 has been rotated in a clockwise direction by the large cassette 1, the photo-sensor 23 is in the light non-shielded state.

When the operation for ejecting the cassette is conducted in a state shown in FIG. 5, the cassette holder 4 horizontally moves to the cassette insertion port 38 after it has been perpendicularly raised in the reversed manner to that described above. Accordingly, the sensor arm 22 rotates in a clockwise direction. As a result, the photo-sensor 26 is brought into the light shielded state. When the moving direction of the cassette holder 4 is changed from the perpendicular direction to the horizontal direction, the sensor arm 19 rotates in a counterclockwise direction by about 90°. However, the photo-sensor 23 is in the light non-shielded, state since the sensor arm 19 has been rotated in the clockwise direction by the bottom of the large cassette 1.

Figure 6:
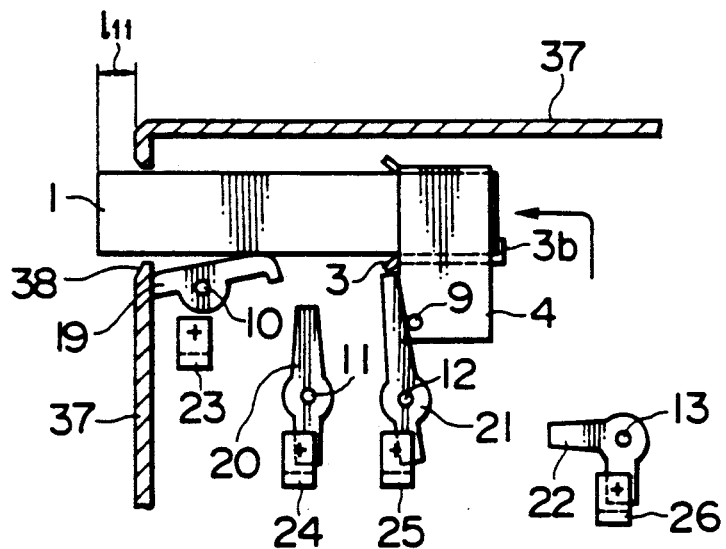
FIG. 6 is a cross sectional view which illustrates a state in which the large cassette shown in FIG. 5 has been ejected to a position at which it is arranged to be pulled out.

When the cassette holder 4 moves horizontally, the pin 9 first pushes the sensor arm 21 as shown in FIG. 6 so as to rotate it in a conterclockwise direction. As a result, the photosensor 25 is brought into the light non-shielded state. Therefore, the motor 36 (FIG. 1) is stopped since the photo-sensor 23 is in the light non-shielded state, causing the cassette holder 4 to be stopped at a predetermined position. The large cassette 1 projects over the cassette insertion port 38 by length $l_{11}$ at (FIG. 6) the predetermined position. The projection length $l_{11}$ be optionally determined in accordance with the distance from the sensor arm 21 and the photo-sensor 25 to the cassette insertion port 38. The position of the sensor arm 21 with respect to the position of the sensor arm 20 and the position of the photo-sensor 25 with respect to the position of the photo-sensor 24 are determined so as to make the projection length $l_{11}$ substantially the same as the projection length $l_2$ of the small cassette 2 shown in FIG. 2.

As described above, the sensor arm 21 and the photo-sensor 25 constitute means for detecting a specific position for the large cassette.

Figure 7:
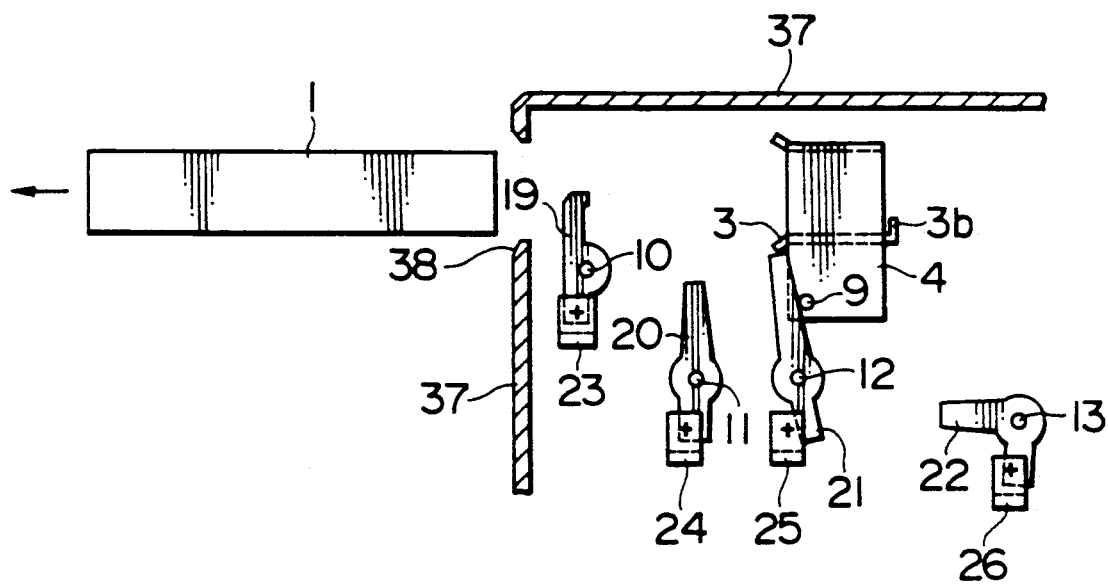
FIG. 7 is a cross sectional view which illustrates a state in which the large cassette shown in FIG. 6 has been pulled out.
Figure 8:
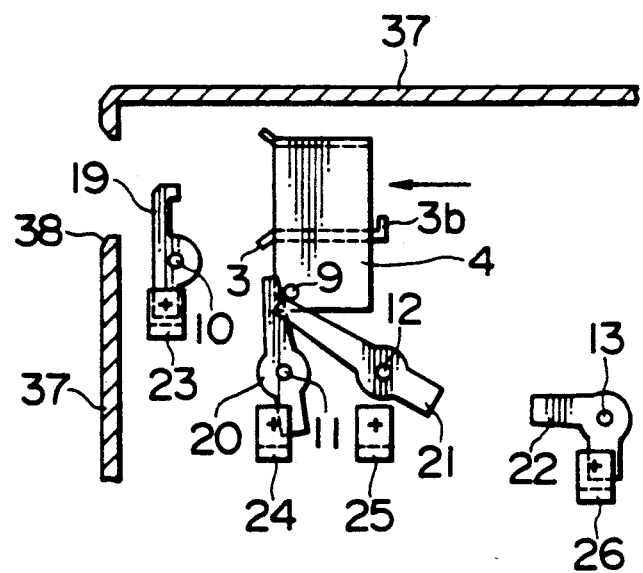
FIG. 8 is a cross sectional view which illustrates a state in which the cassette holder has been moved to its normal position after the large cassette had been pulled out as shown in FIG. 7.
Figure 9:
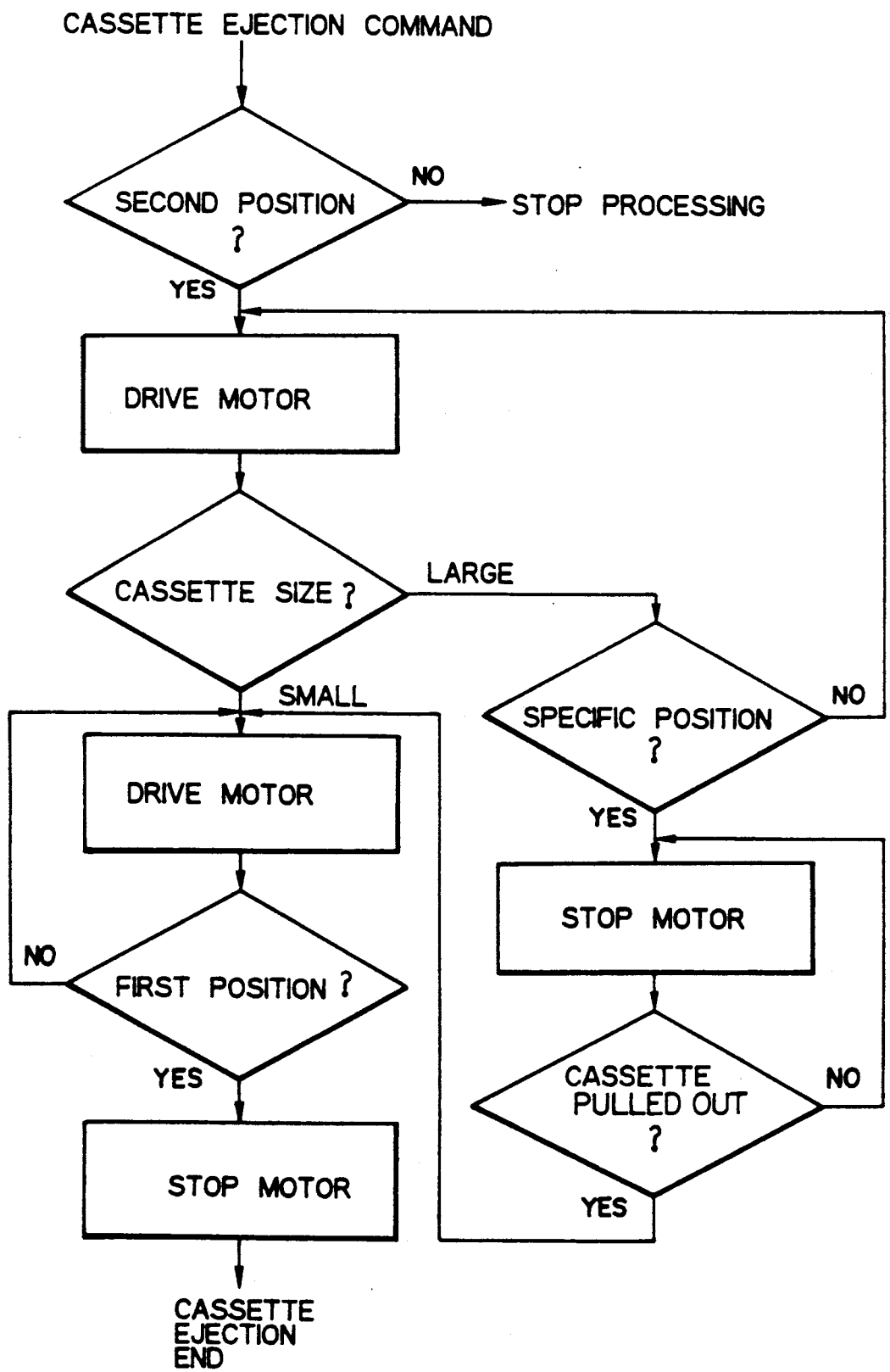
FIG. 9 is a flow chart showing an operation for ejecting a cassette performed by the cassette loading mechanism shown in FIG. 1.

FIG. 7 illustrates a state in which the large cassette 1 has been pulled out from a state shown in FIG. 6. As seen, when the large cassette is pulled out, the sensor arm 19 rotates in a counterclockwise direction so that the photo-sensor 23 is brought into the light shielded state. Therefore, the sensor arm 19 and the photo-sensor 23 constituting the cassette determining mean also constitute cassette pull out detection means for detecting the fact that the cassette was pulled out and the cassette holder 4 has been emptied. As a result, the motor 36 which has been stopped is driven again so that the cassette holder 4 is horizontally moved to the cassette insertion port 38. Then, the pin 9 of the cassette holder 4 further rotates the sensor arm 20 in a counterclockwise direction as shown in FIG. 8, causing the photo-sensor 24 to be brought into the light non-shielded state. As a result, the motor 36 (FIG. 1) is stopped, causing the cassette holder 4 to be stopped. Since the position at which the cassette holder 4 has been moved at this time is the same as that shown in FIGS. 2 and 4, the operation for loading the large cassette 1 or the small cassette 2 can be started again. If the cassette holder 4 is maintained at the position shown in FIG. 7, it is inconvenient when the small cassette 2 is inserted at the next operation since the small cassette 2 must be inserted deeply into the cassette insertion port 38 so as to rotate the sensor arm 31. However, according to the invention, since the cassette holder 4 moves to the position shown in FIG. 8, the insertion of the small cassette can also be conducted easily.

The sensor arm 19 is always positioned between the cassette holder 4 and the cassette insertion port 38. Therefore, when the large cassette 1 is to be pulled out of the cassette holder 4, the cassette holder 4 moves after the large cassette 1 has been pulled out and sensor arm 19 has thereby brought the photo-sensor 23 into the light shielded state. Therefore, the moving cassette holder 4 does not come in contact with the pulled out large cassette 1. Accordingly, the safety of the cassette holder 4 and other related elements can be secured. Furthermore, when the cassette is held so as to be pulled out, a problem, arising from the fact that it cannot be pulled out easily due to the fact that the cassette is pushed by the cassette holder 4, can be prevented.

As described above, according to the present invention, the length of projection of the cassette over the cassette insertion port at the time of ejection of the cassette can be properly determined. Therefore, the length of projection can be determined in accordance with the size of the cassette. As a result, all of the cassettes of various sizes project over the cassette insertion port by a proper length. Therefore, the cassettes can easily be pulled out without any fear of an instable functioning of the cassette loading mechanism.

Furthermore, according to the present invention, even if the length of projection of the cassette over the cassette insertion port has been optionally determined so as to correspond to the size of the cassette, the cassette holder can be always properly maintained at a predetermined position when the next cassette is inserted. As a result, cassettes of different sizes can be readily and reliably be mounted on the cassette holder.

In addition, according to the present invention, the determination of the length of the projection of the ejected cassette over the cassette insertion port can be properly determined. Furthermore, the position of the cassette holder at the time of the loading of the cassette can be properly conducted. These determinations can be conducted only by additionally providing the cassette holder position determining means, the cassette pull out detection means and the cassette size detection means. Furthermore, a increase in the number of the elements can be minimized since the cassette pull out detection means also serves as the cassette size detection means. Therefore, any increases in the space for accommodating and additional elements can be substantially ignored. Furthermore, since the above-described detection means can be stably fastened, wiring for establishing these detection means can be easily conducted.

Furthermore, according to the present invention, the cassette pull out detection means causes the cassette holder to move to a predetermined initial position after the cassette pull out detection means has detected the fact that the cassette was pulled out and the cassette holder has been emptied. Therefore, the problem arising from the fact that the cassette which has not been pulled out completely is inevitably pushed by the moving cassette holder can be prevented.

As many apparently widely different embodiments of this invention may be made without departing from the spirit and scope thereof, it is to be understood that the invention is not limited to the specific embodiments thereof except as defined in the appended claims.

What is claimed is:

1. A cassette loading mechanism comprising:
 a cassette holder for holding a cassette positioned at a first position;
 a support member for supporting said cassette holder so that said cassette holder can be moved along a predetermined path from said first position to a second position at which the cassette is arranged in a loaded position;
 a driving member for moving said cassette holder along said path;
 first detection means for detecting a movement of said cassette holder from said first position to said second position;
 second detection means for detecting a movement of said cassette holder from said second position to said first position, wherein said driving member is controlled in accordance with an output from each of said first detection means and said second detection means;
 specific position detection means for detecting a reaching of said cassette holder at a specific position along said predetermined path, said specific position being a position different from either said first position or said second position so that said driving member is controlled by an output from said specific position detection means during movement of said cassette holder from said second position to said first position and said cassette holder is stopped at said specific position, whereby said cassette can be pulled out from said cassette holder.

2. A cassette loading mechanism according to claim 1, further comprising cassette pull out detection means for detecting that the cassette has been pulled out of said cassette holder stopped at said specific position so that said driving member moves said cassette holder from said specific position to said first position in accordance with a detection made by said cassette pull out detection means.

3. A cassette loading mechanism according to claim 2, wherein said cassette pull out detection means is positioned in a vicinity of a cassette insertion port or a position between said cassette insertion port and said cassette holder positioned at said first position.

4. A cassette loading mechanism according to claim 1, wherein said cassette holder is adapted to accommodate a plurality of types of cassettes of varying sizes, and wherein cassette determining means are provided for detecting that a cassette of a predetermined size is accommodated by said cassette holder, whereby said specific position detection means controls said driving member when said cassette of said predetermined size is accommodated by said cassette holder while moving from said second position to said first position.

5. A cassette loading mechanism according to claim 4, further comprising cassette pull out detection means for detecting that the cassette has been pulled out of said cassette holder stopped at said specific position so that said driving member moves said cassette holder from said specific position to said first position in accordance with a detection by said pull out detection means.

6. A cassette loading mechanism according to claim 5, wherein said cassette pull out detection means is positioned in a vicinity of a cassette insertion port or a position between said cassette insertion port and said cassette holder positioned at said first position.

7. A cassette loading mechanism according to claim 6, wherein said cassette determining means serves as said cassette pull out detection means.

8. A cassette loading mechanism according to claim 4, wherein a length of projection of the cassette beyond a cassette insertion port is substantially the same when said cassette holder accommodating said cassette of said predetermined size is positioned at said specific position and when said cassette holder accommodating a cassette of another size is positioned at said first position.

9. A cassette holding mechanism according to claim 8, further comprising cassette pull out detection means for detecting that the cassette has been pulled out of said cassette holder stopped at said specific position to that said driving member moves said cassette holder from said specific position to said first position in accordance with a detection made by said pull out detection means.

10. A cassette loading mechanism according to claim 9, wherein said cassette pull out detection means is positioned in a vicinity of said cassette insertion port or a position between said cassette insertion port and said cassette holder positioned at said first position.

11. A cassette loading mechanism according to claim 10, wherein said cassette determining means serves as said cassette pull out detection means.

* * * * *